Aug. 12, 1941.    E. T. SLAYTON    2,252,044
CUTTER FOR CUTTING GEARS
Filed June 26, 1939    2 Sheets-Sheet 1

Inventor
Ensign T. Slayton
By
B. E. Schlesinger
Attorney

Aug. 12, 1941.   E. T. SLAYTON   2,252,044
CUTTER FOR CUTTING GEARS
Filed June 26, 1939   2 Sheets-Sheet 2

Inventor
Ensign T. Slayton
By
B. E. Schlesinger
Attorney

Patented Aug. 12, 1941

2,252,044

UNITED STATES PATENT OFFICE 2,252,044

CUTTER FOR CUTTING GEARS

Ensign T. Slayton, Irondequoit, N. Y., assignor to Gleason Works, Rochester, N. Y., a corporation of New York Application June 26, 1939, Serial No. 281,096

5 Claims. (Cl. 29—105)

The present invention relates to the production of gears and particularly to the finish-cutting of longitudinally curved tooth gears such as spiral bevel and hypoid gears of the "formate" (non-generated) type.

In the cutting of any except the very smallest of tapered gears, it is customary to first rough-cut the tooth spaces of the blank and then to finish-cut the sides of the spaces. In practice, it has heretofore always been necessary to rough-cut the tooth spaces deeper than they are finish-cut. The purpose of this is to relieve the tips of the blades of the finish-cutting tool from cutting in the bottom of the tooth spaces so that the finish-cutting blades may have longer life, the gear may be finish-cut without chatter, and the greatest possible accuracy in tooth spacing may be obtained.

The point width of a roughing cutter is always less than the point width of a finishing cutter. With the known practice, then, there have always been ridges left in the bottoms of the tooth spaces of a gear where the deeper roughed tooth bottom joins the shallower finished portions of the tooth space at the sides of the tooth space bottom. These ridges have not presented any difficulty as far as operation of the gears is concerned because gears are always meshed so that there is some space between the tips of the teeth of one member of a pair and the bottoms of the tooth spaces of the other member of the pair and as long as the tooth surfaces are finish-cut for their full working depth, the gears will run smoothly together.

Gears are being contantly required, however, to carry greater and greater loads and it is becoming constantly more and more desirable, therefore, to increase their strength.

One object of the present invention is to make it possible to improve the shape of the finished tooth spaces of gears to increase the strength and load-carrying capacity of their teeth.

A further object of the invention is to eliminate the formation of ridges in the bottoms of the tooth slots in the finish-cutting operation. The elimination of the ridges has the virtue not only of providing smoother tooth spaces but also in itself of increasing the strength of the gears, for ridges are always likely to be source of cracks and gear failure if the gears are heavily loaded.

Still another object of the invention is to provide an improved face-mill gear cutter of the "single-cycle" type which will accomplish the desired results in the finish-cutting operation.

Other objects of the invention will be apparent hereinafter from the specification and from the recital of the appended claims.

Figure 1:
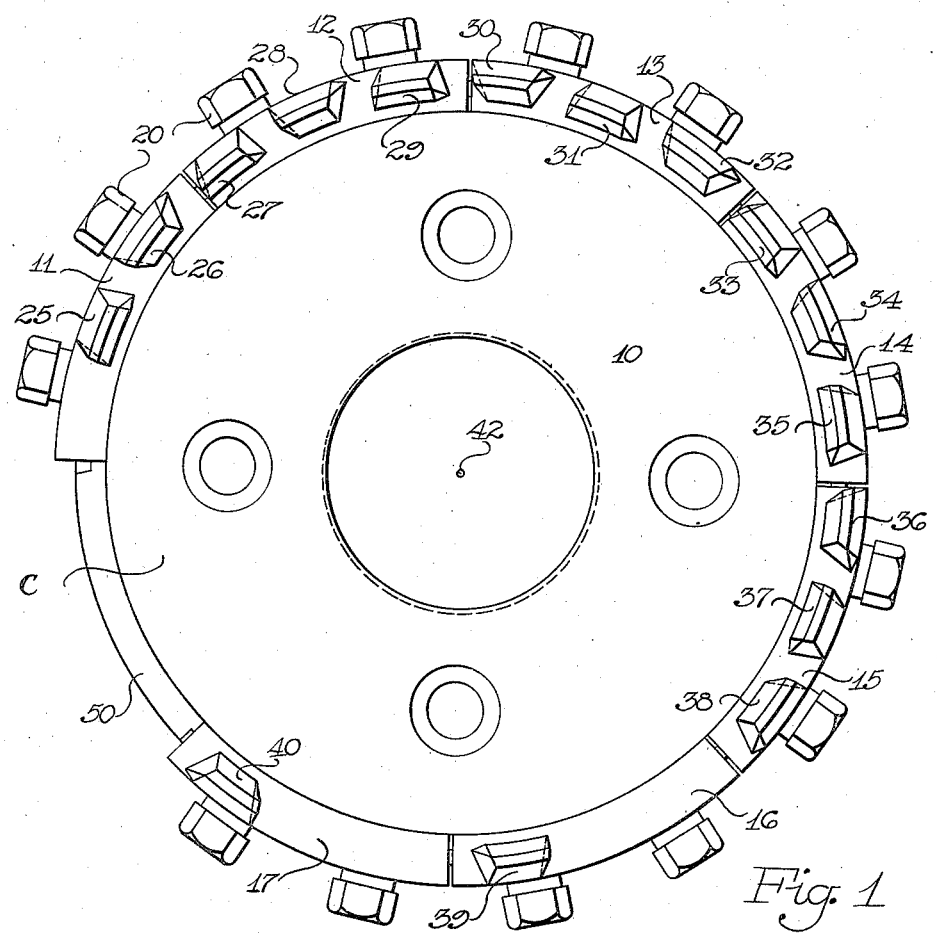
Fig. 1 is a plan or face view of a "single-cycle" type face-mill gear cutter constructed according to the present invention.
Figure 2:
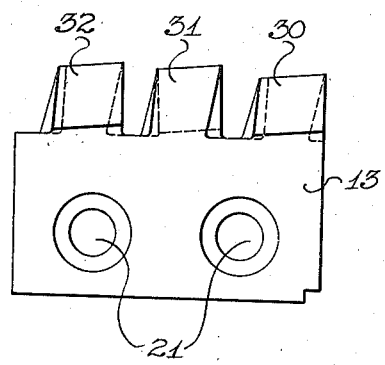
Fig. 2 is a developed side elevation of one of the segments of this cutter.

With the present invention, the tooth spaces of a gear are finish-cut to the same depth as they have previously been rough-cut. By employing a new form of cutter, preferably of the "single-cycle" type, this can be accomplished without any danger of producing a chatter that might affect the smoothness of the finish of the sides of the tooth spaces and without any danger that the finish-cutting operation in the bottoms of the tooth spaces may affect the accuracy of tooth spacing. With the present invention, a cutter is provided that is constructed to take finishing cuts in the bottom of the roughed tooth spaces simultaneously with stocking cuts on the sides of the roughed tooth spaces and then to take final finishing cuts on the sides only.

The cutter employed may take various forms. Preferably, however, it is provided with a series of stocking blades of progressively increasing height and progressively increasing point width which cut down to the depth of the roughed tooth slot as a limit and these are followed by finish-cutting blades which are offset radially with reference to the preceding stocking blades but which are of slightly less height than the last stocking blade to cut on the sides of the tooth slot only and finish-cut the slot to the desired width. In the "single-cycle" type of cutter, the blades are arranged partway only around the periphery of the cutter and there is a gap between the last and first blades of sufficient angular extent to permit of indexing the blank, when the gap is abreast of the blank, without relative separation of the cutter and blank.

When the "single-cycle" type of cutter is employed, it is adjusted into engagement with the gear blank so that its blades will cut to the full depth of the tooth spaces of the blank without any relative depthwise feed movement between the cutter and blank, the cutter is rotated in engagement with the blank, the blank is preferably held stationary during operation of the blades, and it is indexed when the gap in the cutter is abreast of the blank. On each revolution of the cutter, then, a tooth space of the blank will be finished and when the blank has made as many revolutions as there are tooth spaces in the blank, the gear itself will be finished.

Reference will now be had to the drawings for a more detailed description of the invention.

10 denotes the body or head of a "single-cycle" type cutter C constructed according to one embodiment of this invention. In the embodiment shown, the cutter is of the segmental type and there are a plurality of cutting segments 11 to 17 inclusive which are secured to the periphery of the cutter head by bolts 20. Each segment is provided with a pair of holes 21 and a pair of bolts 20 are passed through the holes and threaded into the cutter head to secure the segment to the cutter head.

The cutter is provided with a plurality of blades 25 to 40 inclusive which are formed integral with the different segments to project beyond one side face of the head in the general direction of the axis 42 of the head. Each blade of the cutter may be sharpened to cut on both sides of a tooth space of a gear blank. Preferably, however, as shown, alternate blades are sharpened to cut, respectively, on opposite sides of a tooth space. Thus, the blades 25, 27, 29, etc., are inside cutting blades, cutting on the convex side of a tooth space of the blank while the blades 26, 28, 30, etc., are outside cutting blades, cutting on the concave side of a tooth space. The blades are, of course, relieved on their side and tip surfaces as is common practice in the construction of face-mill gear cutters.

The blades are so formed that the corresponding side-cutting edges of successive blades are offset from one another radially of the axis 42 of the cutter head. Thus the side-cutting edges of successive inside cutting blades 25, 27, 29, etc., are slightly offset from one another radially inwardly of the axis of the cutter. The cutting edge of the blade 27 is slightly closer to the axis 42 of the cutter than the cutting edge of the blade 25; the cutting edge of the blade 29 is slightly closer to the axis 42 than that of the blade 27, etc., the side-cutting edge of the final inside cutting blade 39 being closest of all to the axis 42. Similarly, each successive cutting edge of the outside cutting blades is slightly offset radially outwardly with respect to the next preceding outside cutting edge. Thus, the outside cutting edge of the blade 28 is slightly farther from the axis 42 than the outside cutting edge of the blade 26, etc., the final outside cutting blade 40 having a cutting edge farthest removed from the axis 42 of the cutter.

In addition to the variation in radial position of the cutting edges of the blades, the blades have also a variation in height. In the cutter illustrated, the inside cutting blades 25, 27, 29 and 31 are made of progressively increasing height and similarly the outside cutting blades 26, 28, 30 and 32 are made of progressively increasing height to cut progressively deeper into the tooth spaces of a gear blank at opposite sides thereof. The blades 31 and 32 are of a height sufficient to cut to the full depth of the roughed tooth space of the gear blank.

These blades 25 to 32 inclusive are followed by the blades 33 to 38 inclusive which are of uniform height. Their height may be such that they cut to full depth of the roughed tooth space but preferably they will be made one or two thousandths of an inch less in height than the blades 31 and 32. This will assure that they do no cutting in the bottoms but only on the sides of the tooth spaces of the gear.

The final blades 39 and 40 may be of the same height as the blades 33 to 38 inclusive but preferably are made slightly shorter than these blades (.002–.004" for instance) again for the purpose of insuring that they will not cut in the bottoms. The two final blades 39 and 40 are the final finishing blades and it is especially desirable to avoid having these blades do any bottom cutting because they produce the final finished side tooth surfaces of the gear. Unless their cut is smooth and free from chatter, the finished tooth surfaces produced on the gear will not be smooth and free from chatter.

Figure 3:
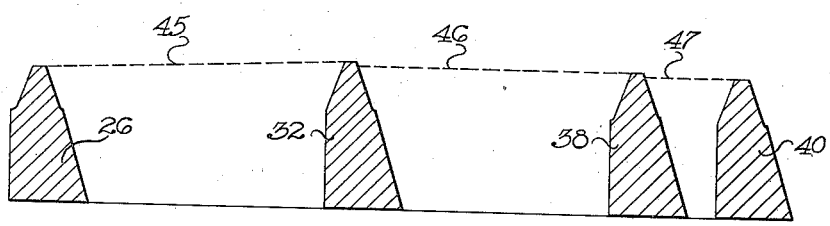
Fig. 3 is a diagrammatic view illustrating the construction of this cutter.

The arrangement of the blades as regards height is illustrated diagrammatically in Fig. 3 for the outside cutting blades. As already described, the inside cutting blades are similarly arranged. The outside cutting blades 26–32 inclusive are of increasing height as indicated by the dotted line 45. The blades 34–38 inclusive are of uniform height but preferably less in height than the blade 32, as indicated by the dotted line 46 and the blade 40 is preferably made of less height than the blades 34–38 inclusive as indicated by the dotted line 47.

The final inside blade 39 is preferably spaced from the immediately preceding blade 38 a distance greater than the face-width of the gear to be cut. Similarly, the final outside blade 40 is preferably spaced from the immediately preceding blade 39 a distance greater than the face-width of the gear to be cut. Thus, when either of the final finishing blades is cutting, no other blade will be in operation. This helps insure a fine finish on the opposite sides of the tooth spaces of the blank and more accurate spacing of the tooth spaces from one another.

There is a gap 50 between the last blade 40 and the first blade 25. This gap is of sufficient angular extent to permit of indexing a gear blank, when the gap is abreast of the blank, without relative separation of the cutter and blank.

Figure 4:
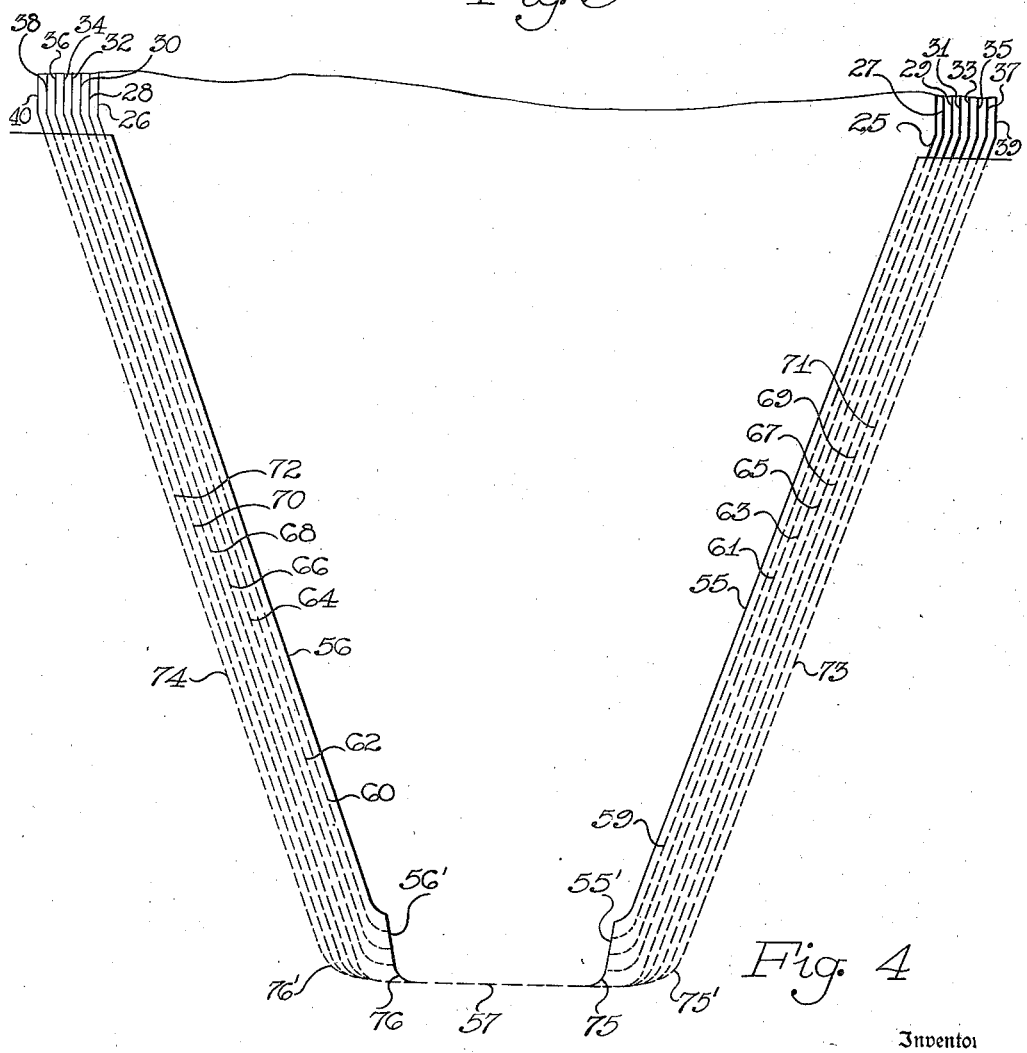
Fig. 4 is a diagrammatic view illustrating the cutting action of the cutter.

The operation of cutting a gear with the cutter C will be clear from Fig. 4. This figure shows a roughed tooth space such as would be produced in a gear roughing operation with a "triplex" type of gear roughing cutter. Such a roughing cutter has bottom-cutting blades that alternate with the opposite side-cutting blades and the bottom-cutting blades project axially of the cutter beyond the side-cutting blades. The bottom-cutting blades are of less pressure angle than the side-cutting blades and, in practice, are ordinarily made of smaller point width than the side-cutting blades.

The tooth space roughed out by such a cutter, then, has opposite sides 55 and 56 of one pressure angle extending for the greater portion of the height of the tooth slot, but at the bottom of the tooth slot, the slot is somewhat narrowed up due to the smaller width of the bottom-cutting blade and this narrower bottom portion of the slot has sides 55' and 56' which have a smaller pressure angle than the remaining portion of the sides of the slot. Further, the fillet radii 75 and 76 at opposite sides of the slot are equal to the radii at the tips of the bottom-cutting blades of the roughing cutter.

The cutter is first adjusted into engagement with the previously roughed gear blank so that it will cut to the full depth of the tooth spaces of the blank without any relative depthwise feed of the cutter into the blank and for cutting a "formate" type gear, the blank is held stationary on its axis during cutting.

As the cutter C is rotated in engagement with the gear blank, the blade 25 will come into action first and will remove from one side of the tooth slot the stock lying between the roughed tooth side 55 and the line 59, thus simultaneously widening and deepening the slot at this side. Then the blade 26 will cut on the opposite side of the tooth slot removing the stock lying between the roughed tooth side 56 and the line 60 and widening and deepening the slot at this side. The following blades 27 to 32 inclusive will then cut alternately on opposite sides of the slot, widening and deepening the slot as shown by the lines 61 to 66 inclusive which indicate the sizes and shapes of the chips removed by these blades. The blades 31 and 32 will cut to the full depth of the roughed tooth space.

The following blades 33 to 38 inclusive will then continue the removal of stock from opposite sides of the tooth space, widening the space as denoted by the lines 67 to 72 inclusive. The cuts taken by these blades will not reach to the same depth as the cuts taken by the blades 31 and 32 because the blades 33 to 38 inclusive are, as already stated, of slightly less height than the blades 31 and 32. The final inside finishing blade 39 will remove the stock between the lines 71 and 73, leaving the finished tooth surface denoted at 73 at one side of the tooth space and the final outside finishing blade 40 will remove the stock between the lines 72 and 74, leaving the finished tooth surface denoted at 74 at the opposite side of the tooth space. The cuts taken by the final finishing blades 39 and 40 will not be as deep as those taken by the preceding blades because the blades 39 and 40 are, as shown in Fig. 3, made of slightly less height than the preceding blades.

When the gap 50 is abreast of the blank, the blank will be indexed so that when the blade 25 rotates into engagement with the blank again, it will cut into a new tooth space of the blank. When the cutter has made as many revolutions as there are tooth spaces in the blank, the gear will be finished.

In the prior finish-cutting practice, the finish-cutting blades did not cut to the full depth of the tooth slot but only as deep as the side-cutting blades of the roughing cutter. With prior practice, then, there were two ridges left in the finished tooth slot where the cut made by the bottom-cutting blades of the roughing tool joined the cuts made by the side-cutting blades of the finishing cutter. With the cutter and method of the present invention, these ridges are entirely eliminated. Moreover, by reason of the successive cuts of the blades of the finishing tool, a tooth slot is produced which has quite large fillet radii at opposite sides as denoted at 75' and 76' in Fig. 4. Oftentimes the fillet radius that can be cut with a cutter of the present invention is twice as great as that which could be produced with prior types of cutters. A tooth of a gear finished according to the process of the present invention, then, is much stronger than would be produced by prior finish-cutting methods.

While the invention has been illustrated in connection with a cutter whose side-cutting edges are of straight profile, it will be understood that it is applicable, also, to cutters having curved cutting edges. In general it may be said that while the invention has been described in connection with a particular embodiment thereof, it is to be understood that it is capable of further modification and this application is intended to cover any variations, uses, or adaptations of the invention following, in general, the principles of the invention and including such departures from the disclosure as come within known or customary practice in the art and as may be applied to the essential features hereinbefore set forth and as fall within the scope of the invention or the limits of the appended claims.

Having thus described my invention, what I claim is:

1. A face-mill cutter for finish-cutting gears by continuous rotation of the cutter and intermittent indexing of the gear blank, comprising a rotary head and a plurality of cutting blades which project beyond one side face of the head in the general direction of the axis of the head and which are arranged part-way only around the periphery of the head with a gap between the last and first blades, said blades having inside and outside cutting edges, successive inside cutting edges being offset radially inwardly of one another and successive outside cutting edges being offset radially outwardly of one another, the first several blades being of progressively increasing height up to the full height of the roughed tooth space as a limit and being followed by a series of blades which are of uniform height, said gap being of sufficient angular extent to permit of indexing the blank, when the gap is abreast of the blank, without complete separation of the cutter and blank.

2. A face-mill cutter for finish-cutting gears by continuous rotation of the cutter and intermittent indexing of the gear blank, comprising a rotary head and a plurality of cutting blades which project beyond the one side face of the head in the general direction of the axis of the head and are arranged part-way only around the periphery of the head with a gap between the last and first blades, said blades having outside and inside cutting edges, successive inside cutting edges being offset radially inwardly of one another, successive outside cutting edges being offset radially outwardly of one another, the first several blades being of progressively increasing height up to the full height of the roughed tooth space of the blank as a limit and being followed by a series of blades which are of uniform height but of slightly less height than the last blade of the first group, said gap being of sufficient angular extent to permit of indexing a gear blank, when the gap is abreast of the blank, without relative separation of the cutter and blank.

3. A face-mill cutter for finish-cutting gears, comprising a rotary head and a plurality of cutting blades which project beyond one side face of the head in the general direction of the axis of the head and which are arranged part-way only around the periphery of the head with a gap between the last and first blades, alternate blades being sharpened to cut, respectively, on opposite sides of a tooth space of a gear blank, successive outside cutting blades having their cutting edges disposed at progressively greater radial distances from the axis of the cutter and successive inside cutting blades having their cutting edges disposed at progressively smaller radial distances from the axis of the cutter, the first blades being of progressively increasing height and being followed by a series of blades which are of uniform height but of slightly less height than the highest of the first series of blades, and being followed, in turn, by an inside and an outside cutting blade which are of the same height but of less height than the blades of the second series, said gap being of sufficient angular extent to permit of indexing a gear blank, when the gap is abreast of the blank, without relative separation of cutter and blank.

4. A face-mill gear cutter for finish cutting gears comprising a rotary head and a plurality of cutting blades which project beyond one side face of the head in the general direction of the axis of the head, said blades having inside and outside cutting edges, successive inside cutting edges being offset radialy inwardly one of another, successive outside cutting edges being offset radially outwardly of one another, the corresponding side-cutting edges of the first several blades of the cutter being of progressively increasing height and being followed by blades whose corresponding side-cutting edges are of uniform height but of slightly less height than the last of the blades of the first group, all of the blades being relieved on their sides and tips back of their front faces and being formed with rounds at the juncture of their side cutting edges and tips.

5. A face-mill gear cutter for finish cutting gears comprising a rotary head and a plurality of cutting blades which project beyond one side face of the head in the general direction of the axis of the head, opposite side cutting edges of successive blades being offset radially inwardly and outwardly, respectively, relative to corresponding side cutting edges of preceding blades, the first several blades of the cutter having cutting portions of progressively increasing height and being followed by blades whose cutting portions are of uniform height but of slightly less height than the last of the blades of the first group, and these latter blades being followed by final finishing blades whose cutting portions are of slightly less height than the cutting portions of the second group of blades, all of the blades being formed with rounds at the juncture of their side cutting edges and their tips.

ENSIGN T. SLAYTON.